United States Patent [19]

Lindström

[11] Patent Number: 5,129,758

[45] Date of Patent: Jul. 14, 1992

[54] SYSTEM AND METHOD FOR DISTRIBUTION OF GREYWATER TO A SOIL BED

[75] Inventor: Carl R. Lindström, Cambridge, Mass.

[73] Assignee: Clivus Multrum, Inc., Lawrence, Mass.

[21] Appl. No.: 645,640

[22] Filed: Jan. 25, 1991

[51] Int. Cl.[5] .................. A01G 25/06; B05B 1/28
[52] U.S. Cl. ............................. 405/48; 405/43; 138/103; 239/533.13; 239/570
[58] Field of Search ............ 405/36, 43, 44, 48, 405/51; 47/48.5; 138/103, 111; 239/533.13, 542, 570; 210/340; 285/5, 13, 14

[56] References Cited

U.S. PATENT DOCUMENTS

| | | | |
|---|---|---|---|
| 582,432 | 5/1897 | O'Neil et al. | 210/340 X |
| 3,426,544 | 2/1969 | Curtis | 405/44 |
| 3,547,355 | 12/1970 | Salazar | 239/570 X |
| 3,899,135 | 8/1975 | O'Brian | 239/533.13 |
| 4,402,631 | 9/1983 | Rosenthal | 405/48 |
| 4,588,325 | 5/1986 | Seefert | 405/46 |
| 4,608,175 | 8/1986 | Nuttle | 210/532.2 |
| 4,756,339 | 7/1988 | Buluschek | 239/542 X |
| 4,904,112 | 2/1990 | McDonald | 405/43 X |
| 4,948,295 | 8/1990 | Pramsoler | 405/44 |
| 4,971,253 | 11/1990 | Lazarus | 239/542 X |

FOREIGN PATENT DOCUMENTS

| | | |
|---|---|---|
| 2508865 | 9/1976 | Fed. Rep. of Germany ............ 239/533.13 |
| 1442605 | 2/1988 | U.S.S.R. .................. 405/43 |

Primary Examiner—Randolph A. Reese
Assistant Examiner—John A. Ricci
Attorney, Agent, or Firm—Hamilton, Brook, Smith & Reynolds

[57] ABSTRACT

A system and method is disclosed for distributing greywater to a soil bed without significant erosion of the soil bed. An interior tube defining at least one aperture is disposed within an exterior tube. The interior tube and the exterior tube are immersed in a soil bed for aerobic decomposition of greywater discharged from the greywater distribution apparatus into the soil bed. The apertures of the interior tube are sealed from the soil bed when greywater is not being discharged into the soil bed. Directing greywater into the interior tube at a sufficient pressure causes greywater within the interior tube to be directed through the apertures. The exterior tube baffles the flow of greywater through the apertures, thereby diminishing the velocity of the greywater. The greywater then passes between the interior tube and the exterior tube and is discharged from the exterior tube through a slot which extends along a substantial portion of the exterior tube. The greywater is thereby discharged from the greywater distribution apparatus at a velocity and a flow rate which is sufficiently slow to prevent significant erosion of the soil bed.

16 Claims, 5 Drawing Sheets

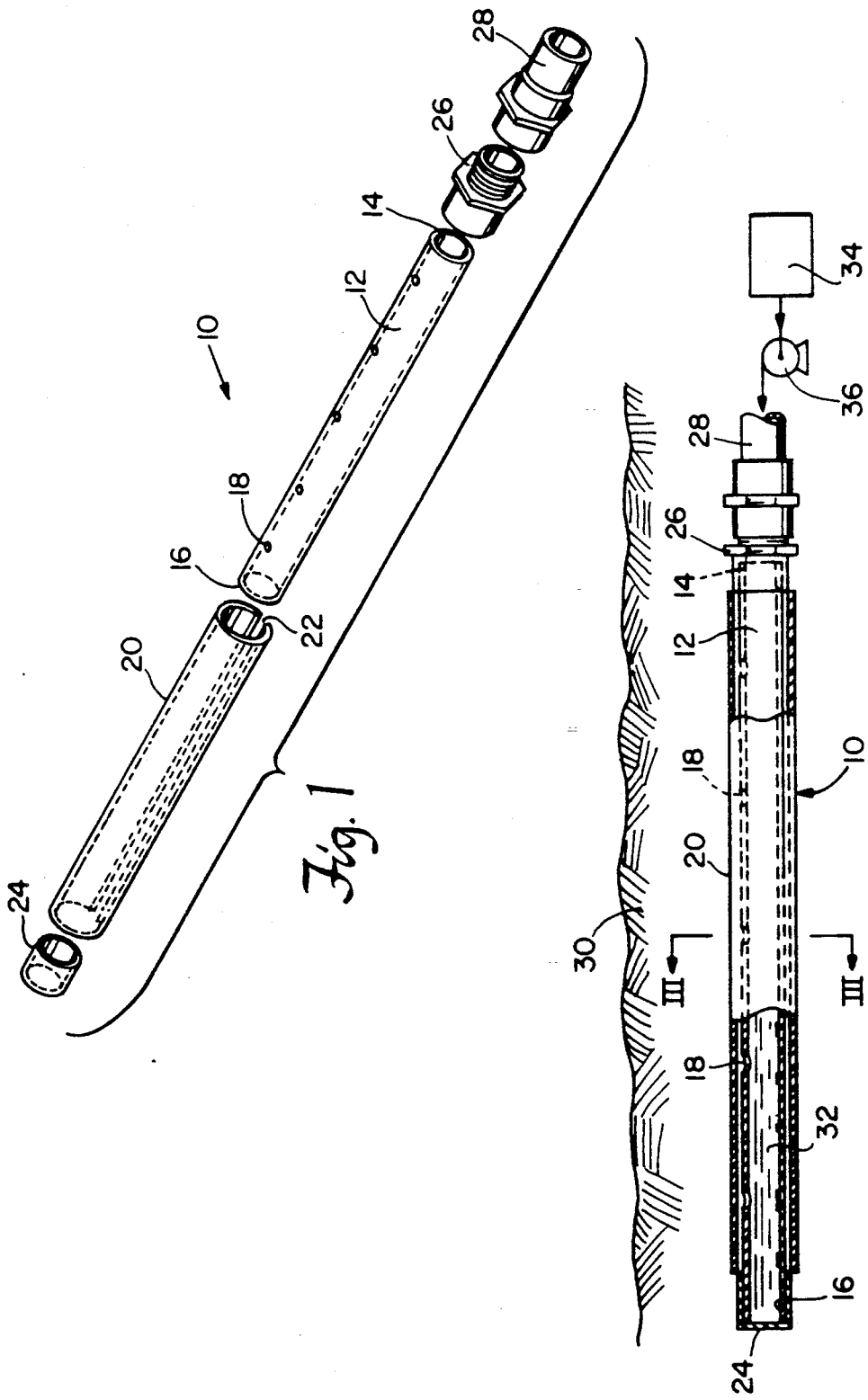

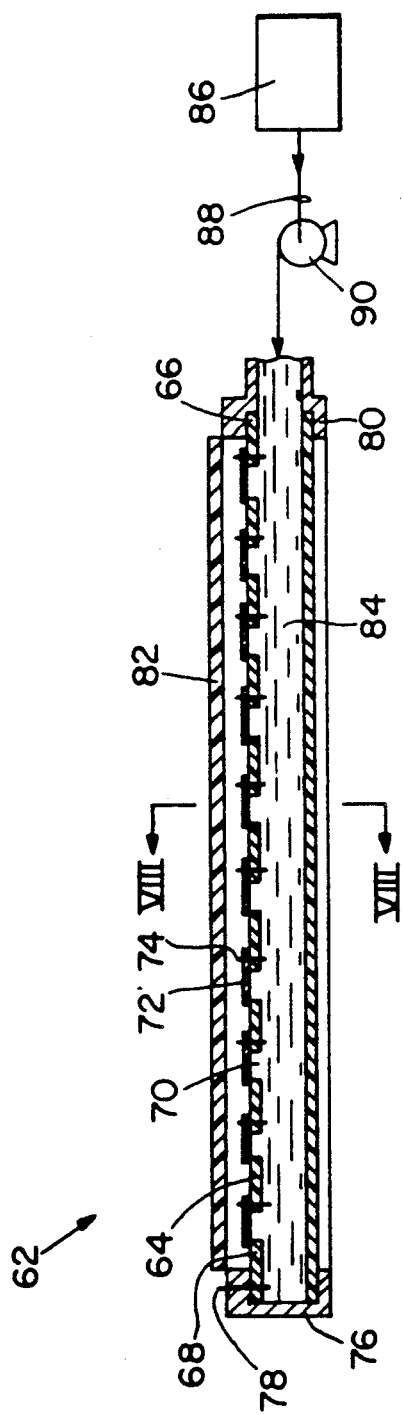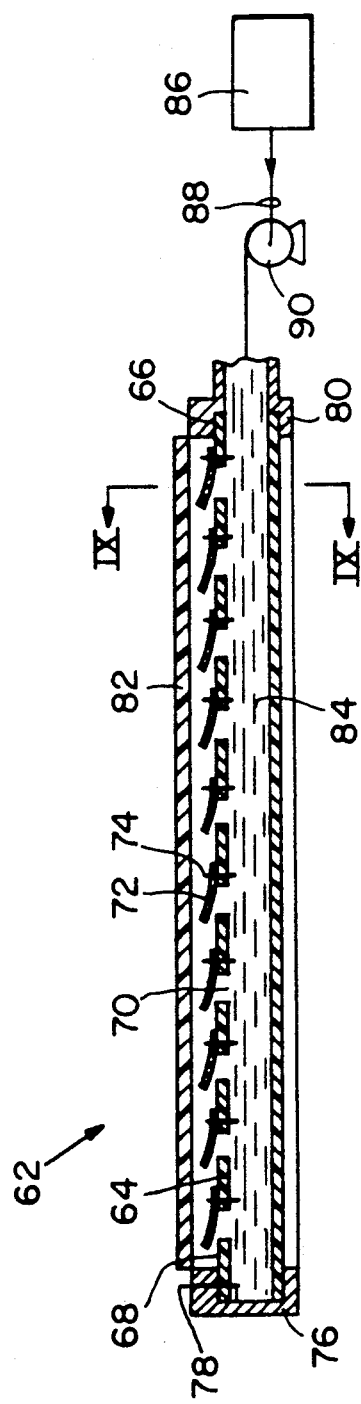

SYSTEM AND METHOD FOR DISTRIBUTION OF GREYWATER TO A SOIL BED

BACKGROUND OF THE INVENTION

Greywater, such as residential waste-water discharged from showers, sinks, dishwashers and washing machines, typically has been combined with blackwater, or raw sewage, which must be stored in septic systems or treated at municipal sewage treatment facilities. However, the additional volume contributed by combining greywater with blackwater can significantly increase the treatment cost of blackwater.

An alternative method of treating greywater, which avoids combination with blackwater, is treatment with aerobic bacteria by distributing greywater to a soil bed. However, disposal of greywater in soil beds has been difficult because erosion of soil near the point of discharge often causes collection of greywater in large pools. Generally, collected greywater will putrify and smell if it is left stagnant, such as typically occurs during formation of pools in eroded soil beds.

One attempt to distribute greywater to a soil bed without significant erosion of soil and consequent pooling of greywater includes directing greywater into a perforate tube having apertures distributed along a substantial portion of the length of the tube. However, the pressure of flowing greywater diminishes along the length of such a perforate tube, thereby causing a disproportionate amount of the greywater to be discharged through apertures proximate to an inlet end of the perforate tube. The greywater conducted through the apertures near the inlet end, therefore, are conducted through those apertures at a higher volumetric flow rate and at a higher velocity than through apertures which are distal to the inlet end. A higher volumetric flow rate and higher velocity of flow through apertures near the inlet end of the perforate tube typically causes erosion of soil from around the tube near the inlet end. Therefore, greywater often tends to pool in the eroded soil bed near the inlet end of the perforate tube and consequently putrifies by anaerobic decomposition of the greywater. Also, the apertures of the perforate tube can become clogged with particulates and by organisms within the soil bed, such as insects and worms, thereby causing uneven and diminished distribution of greywater from the perforate tube to the soil bed.

A need exists, therefore, for a new system and method for distributing greywater within a soil bed which overcome or eliminate the aforementioned problems.

SUMMARY OF THE INVENTION

The present invention relates to a new system and method for distributing greywater to a soil bed without significant erosion of the soil bed.

A system for distributing greywater to a soil bed without significant clogging of the system or erosion of the soil bed includes an interior tube for receiving greywater from a greywater source, the interior tube defining at least one aperture for discharging greywater from the interior tube. An exterior tube at least partially encloses the interior tube and defines a slot which extends along at least a substantial portion of the length of the exterior tube, whereby application of sufficient pressure to greywater within the interior tube causes the greywater to flow out of the interior tube through the aperture and provides fluid communication between the aperture and the slot by directing greywater between the interior tube and the exterior tube, the exterior tube baffling the flow of greywater out of the interior tube, thereby distributing the greywater through the slot to the soil bed without significant erosion of the soil bed.

A method for distributing greywater to a soil bed without significant erosion of the soil bed includes directing greywater into an interior tube which defines at least one aperture for discharging greywater from the interior tube. Sufficient pressure is applied to the greywater within the interior tube to direct the greywater through the aperture and between the interior tube and an exterior tube which at least partially encloses the interior tube and which defines a slot extending along at least a substantial portion of the length of the exterior tube, whereby the greywater is directed out of the interior tube through the aperture and provides fluid communication between the aperture and the slot by passing between the interior tube and the exterior tube, and whereby the flow of greywater through the aperture is baffled by the exterior tube, thereby distributing the greywater through the slot to the soil bed without significant erosion of the soil bed.

This invention has many advantages. In general, the flow of greywater discharged through apertures in the interior tube is baffled by the exterior tube. Baffling of the flow significantly reduces the velocity of greywater discharged to the soil bed. Further, baffling of the greywater by the exterior tube and discharge of the greywater through a continuous slot extending along a substantial portion of the length of the exterior tube significantly reduces variation of the flow rate to the soil bed along the length of the exterior tube. Erosion of soil from the soil bed proximate to the slot is thereby substantially reduced. In addition, the apertures of the interior tube are sealed from the soil bed during periods when greywater is not being discharged through the apertures to the soil bed. Therefore, particulates from the soil bed and organisms, such as insects and worms, cannot enter the apertures and block discharge of greywater through the apertures. The pressure required to cause greywater to flow between the interior tube and the exterior tube can also be sufficient to dislodge accumulated particulates and slime from within the interior tube.

BRIEF DESCRIPTION OF THE DRAWINGS

FIG. 1 is an exploded view of one embodiment of a greywater distribution system of the invention.

FIG. 2 is a section view of the embodiment shown in FIG. 1.

FIG. 6 is a section view of another embodiment of the greywater distribution system of the invention including valves which are in a closed position.

FIG. 7 is a section view of the embodiment shown in FIG. 6 wherein the valves are in an opened position.

DETAILED DESCRIPTION OF THE INVENTION

Figure 3:
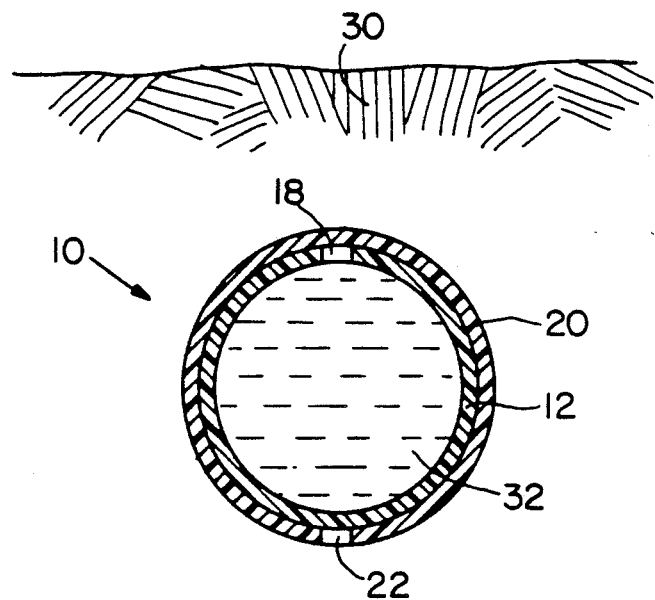
FIG. 3 is a section view taken along line III—III of FIG. 2 illustrating an interior tube disposed within an exterior tube of the invention when the exterior tube is in a relaxed position.

The features and other details of the apparatus and method of the invention will now be more particularly described with reference to the accompanying drawings and pointed out in the claims. The same number present in different figures represents the same item. It will be understood that the particular embodiments of the invention are shown by way of illustration and not as limitations of the invention. The principal features of this invention can be employed in various embodiments without departing from the scope of the invention.

In one illustration of the invention, an exploded view of which is shown in FIG. 1, a greywater distribution system 10 includes interior tube 12. Interior tube 12 has an inlet end 14 and a capped end 16. Apertures 18 are defined by interior tube 12. Preferably, apertures 18 are aligned parallel to a major axis of interior tube 12 and are spaced at regular intervals along the length of interior tube 12.

Exterior tube 20 is dimensioned and configured for disposition of interior tube 12 within exterior tube 20. Exterior tube 20 defines a slot 22 which extends the length of exterior tube 20. In one embodiment, interior tube 12 has an internal diameter of one inch. Apertures 18 can have a diameter in the range of between 3/16 and 5/16 inches. Exterior tube 20 is formed of a resilient material. Examples of suitable resilient materials of construction of exterior tube 20 include polyvinyl chloride, etc.

Cap 24 is dimensioned to form an interference fit over one end of interior tube 12. Discharge of greywater from interior tube 12 through the end of interior tube 12 is blocked by cap 24. Fitting 26 is dimensioned and configured to form an interference fit at inlet end 14 of interior tube 12. Fitting 26 is threaded for threaded engagement with greywater conduit 28.

Examples of suitable materials of construction of interior tube 12, cap 24, fitting 26 and greywater conduit 28 include polyvinyl chloride, etc.

As can be seen in FIG. 2, interior tube 12 is disposed within exterior tube 20. Cap 24 is fitted over capped end 16 of interior tube 12. Fitting 26 is fitted over inlet end 14 of interior tube 12. Exterior tube 20 is disposed between cap 24 and fitting 26. Exterior tube 20 abuts cap 24 and fitting 26 to prevent rotation of exterior tube 20 about interior tube 12. Greywater conduit 28 is threaded onto fitting 26 to provide fluid communication between greywater source 28 and interior tube 12.

Greywater distribution system 10 is disposed within soil bed 30. Greywater distribution system 10 is disposed at a depth within soil bed 30 sufficient to cause aerobic decomposition of greywater discharged from greywater distribution system 10. Also, greywater distribution system 10 can be disposed at a sufficient depth within soil bed 30 to prevent drainage from soil bed 30 or evaporation from soil bed 30 without aerobically decomposing a substantial portion of the greywater discharged from greywater distribution system 10. In one embodiment, greywater distribution system 10 is disposed at a distance below the surface of soil bed 30 in the range of between about four and about eight inches.

Greywater 32 is directed into interior tube 12 from greywater source 34 by pump 36 disposed at greywater conduit 28 to thereby increase the pressure of greywater 32 within interior tube 12. Examples of suitable pumps for directing greywater 32 into interior tube 12 include a centrifugal pump, a positive displacement pump, etc. Examples of suitable greywater sources include a dishwasher, washing machine, sink, shower, etc.

FIG. 3 is a section view of greywater distribution system 10 disposed within soil bed 30 taken along lines III—III of FIG. 2. Exterior tube 20 is shown in a relaxed position in FIG. 3. Interior tube 12 is oriented so that aperture 18 is directed in a generally upward direction. Exterior tube 20 is oriented so that slot 22 is directed in a generally downward direction. In the relaxed position, exterior tube 20 fits tightly about interior tube 12, thereby sealing aperture 18 from soil bed 30. Greywater 32 within interior tube 12 is thereby sealed within interior tube 12. Also, particulate matter and organisms, such as insects, roots and earth worms, are prevented from passing between interior tube 12 and exterior tube 20. Therefore, exterior tube 20 prevents blockage of aperture 18 by migration of debris and organisms from slot 20 into aperture 18.

Upon application of sufficient pressure of greywater 32 within interior tube 12, greywater 32 can be forced through aperture 18 and between interior tube 12 and exterior tube 20. Direction of greywater 32 between interior tube 12 and exterior tube 20 distends exterior tube 20 from the relaxed position, shown in FIG. 3, to a distended position, shown in FIG. 4. Movement of exterior tube 20 to the distended position causes formation of conduit 38, which is defined by interior tube 12 and by exterior tube 20. Conduit 38 provides fluid communication between aperture 18 and slot 22.

Greywater 32 is discharged as flow stream 37 through aperture 18 which is conducted between interior tube 12 and exterior tube 20 to slot 22. Flow stream 39 is discharge of greywater 32 from greywater distribution system 10 through slot 22 to soil bed 30. Greywater 32 passing through aperture 18 impacts exterior tube 20 and spreads along the length of conduit 38. Slot 22, when exterior tube 20 is in the distended position, is larger than the combined area of apertures 18 of interior tube 12. The velocity of greywater 32 passing through slot 22, therefore, is less than the velocity of greywater 32 passing through aperture 18. Also, flow stream 39 is a single stream which extends the length of exterior tube 18, thereby distributing greywater 32 from greywater distribution system 10 to soil within soil bed 30 over the length of exterior tube 20. Greywater 32 is distributed by greywater distribution system 10 to soil bed 30 at a velocity which is sufficiently slow to prevent significant erosion of soil from soil bed 30 under expected use-conditions. The rate of flow of greywater through interior tube 12 under expected use-conditions, when exterior tube 20 is in the distended position, is in the range of between about one-half and about one gallon per minute.

Figure 4:
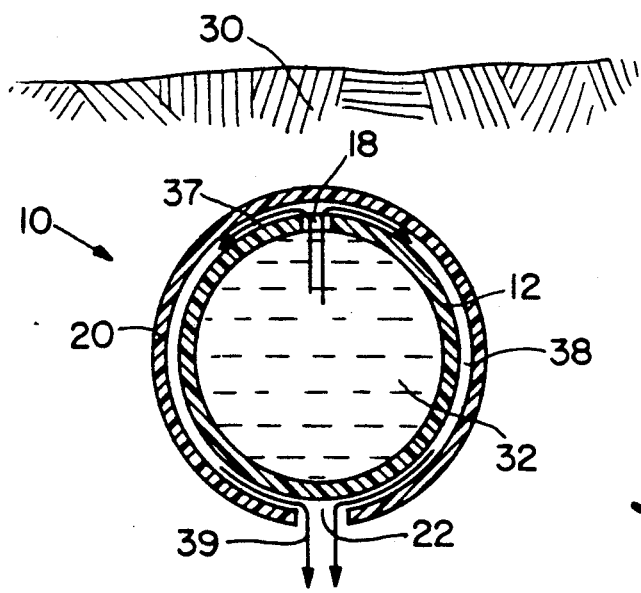
FIG. 4 is section view of the embodiment shown in FIG. 3 when the exterior tube is in a distended position.

When the pressure of greywater 32 within interior tube 12 diminishes to below a level sufficient to maintain exterior tube 20 in the distended position, exterior tube 20 moves from the distended position, shown in FIG. 4, to the relaxed position, shown in FIG. 3. The pressure of greywater 32 within interior tube 12 can be diminished to below a level sufficient to maintain exterior tube 18 in a distended position by, for example, shutting off a pump, not shown, directing greywater 32 into interior tube 12. Movement of exterior tube 20 to the relaxed position causes exterior tube 20 to fit tightly about interior tube 12, thereby sealing apertures 18 from soil bed 30.

Figure 5:
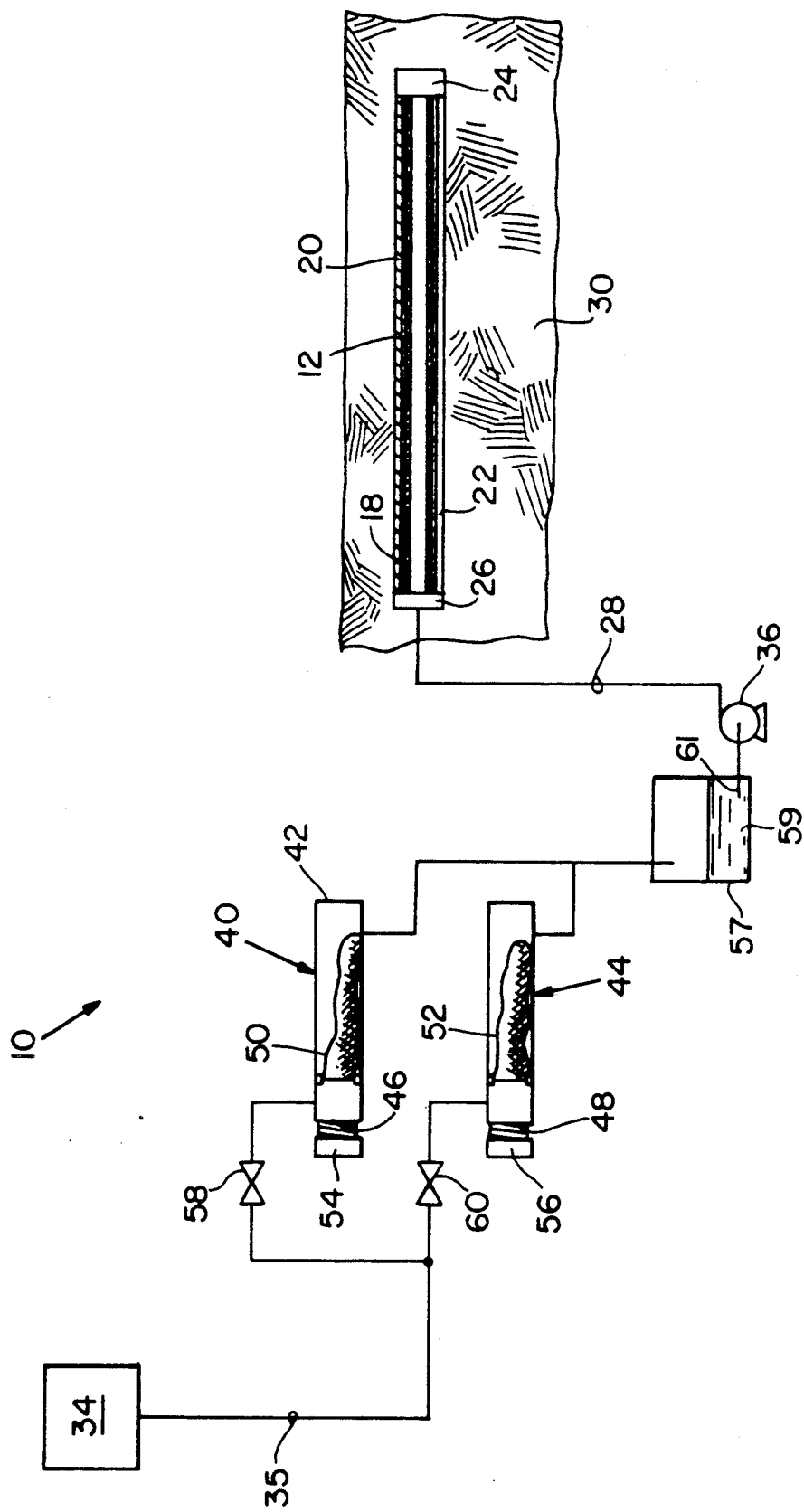
FIG. 5 is a schematic representation of a greywater distribution system of the invention further including a filter assembly.

As can be seen in FIG. 5, greywater distribution system 10 can include a filter assembly 40 which includes a pair of filter housings 42,44 having threaded openings 46,48 and disposed in parallel-flow arrangement at greywater conduit 28. Filters 50,52 are disposed within filter housings 42,44, respectively. Threaded plugs 54,56 seal filter housings 42,44 at threaded openings 46,48. Greywater drains from greywater source 34 by force of gravity through conduit 35 and filter assembly 40 into container 57. Container 57 can be, for example, a sump.

Particulates, such as fibers, which can clog apertures 18 or slot 22, are filtered from the greywater by filters 50, 52. Filters 50,52 are formed of a suitable material for filtering a substantial portion of particulates from greywater. Preferably, the filter material includes an elastic nylon mesh.

Either filter 50 or filter 52 can be isolated from the flow of greywater through greywater conduit 28 by closing either of valves 58,60. For example, valve 58 can be closed to isolate filter 50 within filter housing 42 from the path of flow of greywater through greywater conduit 28. Filter housing 42 can be opened, such as by removing threaded plug 54 and removing filter 50 from filter housing 42 through threaded opening 46 of filter housing 42. Filter 50 can then be replaced or cleaned and reinserted in filter housing 42. Threaded plug 54 is then rethreaded into threaded opening 46.

Valve 58 can then be opened and valve 60 can be closed to redirect the path of flow of greywater from filter housing 44 to filter housing 42 without interrupting the flow of greywater to interior tube 12. Filter 52 is thereby isolated from the flow path of greywater for cleaning or replacement of filter 52.

The amount of greywater 59 within container 57 is sufficient to submerge inlet end 61 of conduit 28. Pump 36 is disposed at conduit 28 for directing greywater 59 from container 57 through conduit inlet end 61 and conduit 28 to interior tube 12. The greywater is pumped by pump 36 through apertures 18 and slot 22 into soil bed 30. Pump 36 can be controlled by automated means, not shown, such as are known in the art, to keep the level of greywater 59 above conduit inlet end 61 within container 57.

In another embodiment of the invention, shown in FIG. 6, greywater distribution system 62 includes interior tube 64. Interior tube 64 includes inlet end 66 and capped end 68. Interior tube 64 defines apertures 70. Apertures 70 are aligned parallel to a major axis of interior tube 64 and spaced at regular intervals along at least a substantial portion of the length of interior tube 64. Spring valves 72 are disposed at apertures 70 and are fixed to interior tube 64. Spring valves 72 are fixed to interior tube 64 by pins 74 extending through spring valves 72 and interior tube 64 and which are in interfering relation with spring valves 72 and interior tube 64.

Interior tube 64 is sealed at capped end 70 by cap 76. Cap 76 is dimensioned and configured to seal capped end 68 by an interference fit between interior tube 64 and cap 76. In addition, pin 78 can extend through interior tube 64 and cap 76 to thereby lock cap 76 onto capped end 68. Fitting 80 is disposed at inlet end 66. Fitting 80 is dimensioned and configured for providing an interference fit between interior tube 64 and fitting 80.

Exterior tube 82 is disposed about interior tube 64 and between cap 76 and fitting 80. Exterior tube 82 abuts cap 76 and fitting 80 to thereby prevent exterior tube 82 from rotating about interior tube 64.

Greywater 84 is directed from greywater source 86 through greywater conduit 88 by pump 90 disposed at greywater conduit 88. Activation of pump 90 causes spring valves 72 to move from a closed position, shown in FIG. 6, whereby spring valves 72 seal apertures 70, to an opened position, shown in FIG. 7, whereby greywater passes through apertures 70 and across spring valves 72. Spring valves 72 are resilient, whereby application of sufficient pressure to greywater 84 within interior tube 64 causes greywater 84 to pass through apertures 70 to thereby deflect spring valves 72 away from apertures 70. Diminishment of pressure within interior tube 64 causes spring valves 72 to move back across apertures 70, thereby sealing apertures 70.

Figure 8:
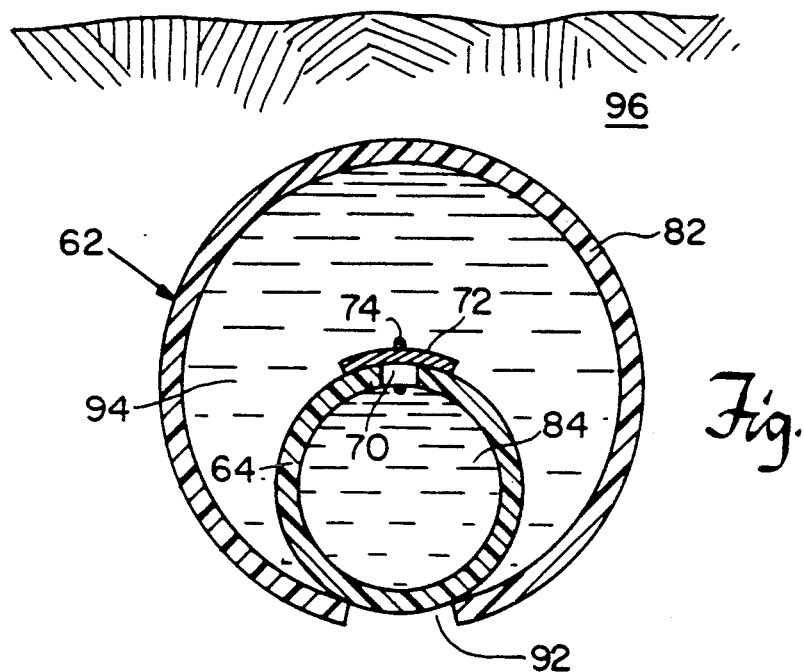
FIG. 8 is a section view taken along line VIII—VIII of FIG. 6 illustrating an interior tube disposed within an exterior tube of the embodiment when the exterior tube is in a relaxed position.

FIG. 8 is a section view of greywater distribution system 62 taken along line VIII—VIII of FIG. 6. Spring valve 72 is in the closed position. Exterior tube 82 defines slot 92 which extends the length of exterior tube 82. Exterior tube 82 abuts interior tube 64 at slot 92, whereby spring valve 72 is sealed from slot 92 when spring valve 72 is in the closed position. Conduit 94 is defined by interior tube 64 and exterior tube 82.

Greywater distribution system 62 is disposed in soil bed 96. Greywater 84 within interior tube 64 is sealed from conduit 88 by spring valve 72. Interior tube 64 abuts exterior tube 82 at slot 92, thereby sealing conduit 94 from soil bed 96. Particulate matter and organisms, such as insects and worms, cannot penetrate conduit 94 or clog slot 92 because slot 92 is sealed by interior tube 64.

Figure 9:
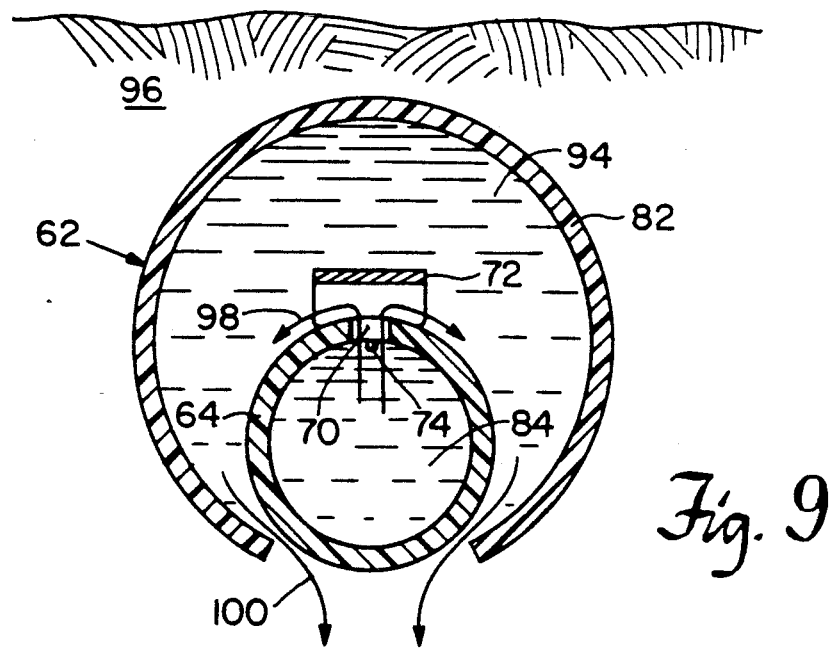
FIG. 9 is a section view taken along line IX—IX of FIG. 7 illustrating the exterior tube in a distended position and the valve of the embodiment in an opened position.

Upon application of sufficient pressure to greywater 84 within interior tube 64, greywater 84 is directed through aperture 70 and moves spring valve 72 from the closed position to an opened position. FIG. 9 is a section view of greywater distribution system 62 taken along line IX—IX of FIG. 7, wherein spring valve 72 is in the opened position. Greywater 84 is discharged as flow stream 98 from interior tube 64 through aperture 70 and across spring valves 72 to conduit 94 while the pressure of greywater 84 within interior tube 64 is maintained at a level sufficient to hold spring valve 72 in the opened position.

In one embodiment, spring valve 72 can be dimensioned and configured to exhibit hysteresis, whereby the spring valve opens under conditions different than the conditions under which the valves will close. In one illustration of a spring valve 72 which exhibits hysteresis, spring valve 72 is arced, as shown in FIG. 8, to conform to the curvature of interior tube 64. Spring valve 72 opens at an upper threshold pressure of greywater 84 within interior tube 64. An example of a suitable upper threshold pressure is a pressure in the range of between about thirty and about fifty psig. Spring valve 72 is suspended in a position remote from aperture 70, as shown in FIG. 9, thereby allowing greywater 84 to pass through aperture 70 to conduit 94. Spring valve 72 is stable in the open position and remains open thereafter at pressures of greywater 84 within interior tube 64 below the upper threshold pressure required to open spring valve 72.

When the pressure of greywater 84 within interior tube 64 diminishes to below a lower threshold value, spring valve 72 becomes unstable in the opened position and moves from the opened position, shown in FIG. 9, to the closed position, shown in FIG. 8. Spring valve 72 thereby reseals aperture 70 from slot 92. Examples of suitable materials of construction of spring valve 70 include stainless steel, etc.

When spring valve 72 is in the opened position, greywater 84 passes through aperture 70 and across spring valve 72 to fill conduit 94. Exterior tube 82 is formed of a resilient material, whereby the pressure of greywater 84 within conduit 94 moves exterior tube 82 from a relaxed position, shown in FIG. 8, to a distended position, shown in FIG. 9. In the relaxed position, interior tube 64 abuts exterior tube at slot 84, thereby sealing conduit from soil bed 96. Movement of exterior tube 82 from the relaxed position to the distended position provides fluid communication between spring valve 72 and slot 92.

Under expected use-conditions, conduit 94 is filled with greywater 84 when exterior tube 82 is in the relaxed position. Therefore, upon application of sufficient pressure to greywater 84 within interior tube 64, exterior tube 82 will move from the relaxed position to the distended position simultaneously with movement of spring valve 72 from the closed position to the opened position.

When spring valve 72 is in the opened position and when exterior tube 82 is in the distended position, fluid communication is thereby provided between greywater 84 with interior tube 64 and soil bed 96, whereby greywater 84 passes through aperture 70 across spring valve 72 as flow stream 98 and then passes through conduit 94 and slot 92 to soil bed 96 as flow stream 100. Pressure sufficient to open spring valve 72 and to move exterior tube 82 from the relaxed position to the distended position can also be sufficient to dislodge slime or particulate matter accumulated within interior tube 64. Dislodged material is conducted by greywater 84 from greywater distribution system 62 to soil bed 96.

Exterior tube 82 baffles the flow of greywater 84 through aperture 70, thereby diminishing the velocity of flow of greywater 84. Also, greywater 84 discharged from interior tube 64 through aperture 70 is dispersed within conduit 94, thereby causing greywater 84 to be discharged from conduit 94 through slot 92 at a substantially constant flow rate along the length of slot 92. The velocity and flow rate of greywater through slot 92 is sufficiently slow under normal use-conditions to prevent significant erosion of soil from soil bed 96. Greywater 84 distributed to soil bed 96 can then be decomposed by aerobic bacteria.

Equivalents

Those skilled in the art will recognize or be able to ascertain using no more than routine experimentation, many equivalents to specific embodiments of the invention described specifically herein. Such equivalents are intended to be encompassed in the scope of the claims.

I claim:

1. A system for distributing greywater to a soil bed without significant clogging of the system or erosion of the soil bed, comprising:
    a) an interior tube having an inlet end for receiving greywater from a greywater source and a capped end disposed opposite the inlet end, the interior tube defining at least one aperture for discharging greywater from the interior tube;
    b) a fitting disposed at the inlet end;
    c) a cap disposed at the capped end; and
    d) a resilient exterior tube disposed between the fitting and the cap, whereby the fitting and the cap abut the exterior tube to prevent significant rotation of the exterior tube about a major axis of the interior tube, the exterior tube at least partially enclosing the interior tube and defining a slot which extends along at least a substantial portion of the length of the exterior tube, whereby application of sufficient pressure to greywater within the interior tube causes the greywater to flow out of the interior tube through the aperture and provides fluid communication between the aperture and the slot by directing greywater between the interior tube and the exterior tube, the exterior tube baffling the flow of greywater out of the interior tube, thereby distributing the greywater through the slot to the soil bed without significant erosion of the soil bed.

2. A system of claim 1 wherein the resilient exterior tube is movable from a relaxed position, whereby the aperture is sealed from the soil by the exterior tube, and a distended position, whereby the aperture is in fluid communication with the soil bed, and wherein application of sufficient pressure of greywater within the interior tube causes the greywater to flow out of the interior tube through the aperture and distends the exterior tube, thereby providing fluid communication between the aperture and the soil bed and distributing the greywater to the soil bed without significant erosion of the soil bed.

3. A system of claim 2 further comprising a valve disposed at the aperture which is movable between a closed position and an opened position in response to a change in pressure of greywater in the interior tube between a pressure which is not sufficient to maintain the valve in the opened position and a pressure which is sufficient to maintain the valve in the opened position.

4. A system of claim 3 wherein the exterior tube is resilient, whereby the interior tube and the exterior tube seal the valve and aperture from the soil bed when the valve is in the closed position and whereby the exterior tube distends to provide fluid communication between the aperture and the soil bed when the valve is in the open position.

5. A system of claim 4 including a plurality of apertures and a valve disposed at each aperture.

6. A system of claim 5 wherein the apertures are substantially aligned.

7. A system of claim 6 wherein the apertures of the interior tube are disposed at the exterior tube opposite the slot of the exterior tube.

8. A system of claim 7 further including at least one filter for separating solid objects from the greywater before the greywater is directed into the interior tube.

9. A system of claim 8 wherein a filter is disposed in each of two parallel conduits, whereby one filter can be isolated from the flow of greywater to the interior tube without interruption of the flow of greywater.

10. A system of claim 9 further including pressurizing means for sufficiently pressurizing the greywater to distend the exterior tube from the relaxed position to the distended position.

11. A system of claim 10 wherein the pressurizing means comprise a pump.

12. A system for distributing greywater to a soil bed without significantly clogging of the system or erosion of the soil bed, comprising:
   a) an interior tube having an inlet end for receiving greywater from a greywater source and a capped end disposed opposite the inlet end, the interior tube defining at least one aperture for discharging greywater from the interior tube;
   b) a fitting disposed at the inlet end;
   c) a cap disposed at the capped end; and
   d) a resilient exterior tube disposed between the fitting and the cap, whereby the fitting and the cap abut the exterior tube to prevent significant rotation of the exterior tube about a major axis of the interior tube, the exterior tube at least partially enclosing the interior tube, the resilient exterior tube defining a slot which is parallel to a major axis of the exterior tube for allowing distension of the resilient exterior tube from a relaxed position, wherein the aperture of the interior tube is sealed from the slot by the resilient exterior tube, to a distended position, wherein the aperture is in fluid communication with the slot, whereby application of sufficient pressure to greywater to flow out of the interior tube through the aperture and distends the resilient exterior tube from the relaxed position to the distended position, and whereby the flow of greywater from within the interior tube through the aperture is baffled, thereby distributing the greywater through the slot to the soil bed without significant erosion of the soil bed.

13. A method for distributing greywater to a soil bed without significant erosion of the soil bed, comprising the steps of:
   a) directing greywater into an interior tube having an inlet end with a fitting disposed at the inlet end and a capped end disposed opposite the inlet end, the interior tube defining at least one aperture for discharging greywater from the interior tube; and
   b) applying sufficient pressure to the greywater within the interior tube to direct the greywater through the aperture and between the interior tube and a resilient exterior tube disposed between the fitting and the cap, whereby the fitting and the cap abut the exterior tube to prevent significant rotation of the exterior tube about a major axis of the interior tube, the exterior tube at least partially enclosing the interior tube and defining a slot extending along at least a substantial portion of the length of the resilient exterior tube, whereby the greywater is directed out of the interior tube through the aperture and provides fluid communication between the aperture and the slot by passing between the interior tube and the resilient exterior tube, and whereby the flow of greywater through the aperture is baffled by the resilient exterior tube, thereby distributing the greywater through the slot to the soil bed without significant erosion of the soil bed.

14. A method for distributing greywater to a soil bed without significant erosion of the soil bed, comprising the steps of:
   a) directing greywater into an interior tube having an inlet end with a fitting disposed at the inlet end and a capped end disposed opposite the inlet end, the interior tube defining at least one aperture for discharging greywater from the interior tube; and
   b) applying sufficient pressure to the greywater within the interior tube to direct the greywater between the interior tube and a resilient exterior tube disposed between the fitting and the cap, whereby the fitting and the cap abut the exterior tube to prevent significant rotation of the exterior tube about a major axis of the interior tube, the exterior tube at least partially enclosing the interior tube and defining a slot which is about parallel with a major axis of the resilient exterior tube, whereby the resilient tube is distended from a relaxed position, wherein the aperture is sealed from the slot by the resilient exterior tube, to a distended position, wherein the aperture is in fluid communication with the slot, and whereby the flow of greywater from within the interior tube through the aperture is baffled, thereby distributing the greywater through the slot to the soil bed without a significant erosion of the soil bed.

15. A method for distributing greywater to a soil bed without significant erosion of the soil bed, comprising:
   a) directing greywater from a greywater source into an interior tube having an inlet end with a fitting disposed at the inlet end and a capped end disposed opposite the inlet end, the interior tube defining at least one aperture for discharging the greywater from the interior tube; and
   b) applying sufficient pressure to the greywater within the interior tube to move a valve disposed at the aperture from a closed position to an opened position and to maintain the valve in the opened position, whereby the greywater passes out of the interior conduit through the aperture in the valve and is conducted between the interior tube and an exterior tube disposed between the fitting and the cap, whereby the fitting and the cap abut the exterior tube to prevent significant rotation of the exterior tube about a major axis of the interior tube, the exterior tube at least partially enclosing the interior tube, and whereby the flow of the greywater through the aperture is baffled, thereby distributing the greywater through the slot to the soil bed without a significant erosion of the soil bed.

16. In an apparatus for distributing greywater to a soil bed by directing greywater through a perforate tube disposed in the soil bed:
   the improvement comprising a resilient exterior tube defining a slot which is parallel to a major axis of the exterior tube, the exterior tube at least partially enclosing the perforate tube, the perforate tube having an inlet end with a fitting disposed at the inlet end and a capped end disposed opposite the inlet end, whereby greywater directed out of the perforate tube through an aperture defined by the perforate tube is conducted between the perforate tube and the exterior tube, the exterior tube being disposed between the fitting and the cap, whereby the fitting and the cap abut the exterior tube to prevent significant rotation of the exterior tube about a major axis of the perforate tube, to the slot, whereby the flow of greywater is baffled, thereby distributing the greywater through the slot to the soil bed without significant clogging of the perforate tube or erosion of the soil bed.

* * * * *